(12) United States Patent  (10) Patent No.: US 9,236,961 B2
Zhu et al.  (45) Date of Patent: Jan. 12, 2016

(54) BROADCAST SWITCHING DEVICE, METHOD AND TERMINAL

(71) Applicant: ZTE Corporation, Shenzhen, Guangdong (CN)

(72) Inventors: Xiang Zhu, Shenzhen (CN); Lei Che, Shenzhen (CN); Chao Wan, Shenzhen (CN); Ting Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/411,964

(22) PCT Filed: Jul. 17, 2013

(86) PCT No.: PCT/CN2013/079545
§ 371 (c)(1),
(2) Date: Dec. 30, 2014

(87) PCT Pub. No.: WO2014/029244
PCT Pub. Date: Feb. 27, 2014

(65) Prior Publication Data
US 2015/0155958 A1 Jun. 4, 2015

(30) Foreign Application Priority Data

Aug. 22, 2012 (CN) .......................... 2012 1 0299815

(51) Int. Cl.
*H04H 20/71* (2008.01)
*H04H 60/09* (2008.01)
(Continued)

(52) U.S. Cl.
CPC ............. *H04H 20/103* (2013.01); *H04B 17/20* (2015.01); *H04B 17/318* (2015.01);
(Continued)

(58) Field of Classification Search
CPC .................................................. H04H 20/106

USPC ........................ 455/3.01, 3.04, 3.06
See application file for complete search history.

(56) References Cited

U.S. PATENT DOCUMENTS 5,584,051 A 12/1996 Goeken
8,489,049 B1 * 7/2013 Chan ...................... H04H 20/26
348/468

(Continued)

FOREIGN PATENT DOCUMENTS

CN 101047816 A 10/2007
CN 102255680 A 11/2011
(Continued)

OTHER PUBLICATIONS

International Search Report in international application No. PCT/CN2013/079545, mailed on Oct. 24, 2013.
(Continued)

*Primary Examiner* — Tilahun B Gesesse
(74) *Attorney, Agent, or Firm* — Oppedahl Patent Law Firm

(57) ABSTRACT

Provided are a broadcast switching device, method and terminal for switching between broadcast modes of a terminal, and the broadcast switching device includes: a second signal broadcasting unit; a first signal broadcasting unit; a signal reception module, connected respectively to the first signal broadcasting unit and the second signal broadcasting unit, configured to receive a first signal and a second signal and receive preferentially the first signal; a parsing module configured to parse the first signal to acquire signal strength of the first signal; a determination module configured to compare the signal strength of the first signal with a preset broadcasting strength and obtain a comparison result; and a switching module configured to control the signal reception module to receive the second signal when comparison result is that the signal strength of the first signal cannot meet the preset broadcasting strength. By means of technical solutions of the present disclosure, a digital broadcast signal can be switched to an FM broadcast signal when signal strength of the digital broadcast signal cannot meet broadcasting requirements, thus providing a user with optimal audio experiences.

10 Claims, 3 Drawing Sheets

(51) Int. Cl.
*H04H 40/00* (2009.01)
*H04H 20/10* (2008.01)
*H04H 20/26* (2008.01)
*H04H 20/22* (2008.01)
*H04B 17/20* (2015.01)
*H04H 20/12* (2008.01)
*H04H 60/74* (2008.01)
*H04B 17/318* (2015.01)

(52) U.S. Cl.
CPC ............ *H04H 20/106* (2013.01); *H04H 20/12* (2013.01); *H04H 20/22* (2013.01); *H04H 20/26* (2013.01); *H04H 60/74* (2013.01)

(56) References Cited

U.S. PATENT DOCUMENTS

| | | | |
|---|---|---|---|
| 9,026,072 B1* | 5/2015 | Chan | ............ H04H 20/26 348/468 |
| 2004/0043730 A1 | 3/2004 | Schill | |
| 2004/0136406 A1 | 7/2004 | Kuramoto | |
| 2005/0153650 A1 | 7/2005 | Hikomoto | |
| 2006/0062363 A1* | 3/2006 | Albrett | ............ G06Q 30/02 379/101.01 |
| 2012/0129476 A1* | 5/2012 | Whikehart | ............ H04B 1/082 455/179.1 |

FOREIGN PATENT DOCUMENTS

| | | | | |
|---|---|---|---|---|
| CN | 102637964 A | | 8/2012 | |
| CN | 10283022 A | * | 12/2012 | ............ H04H 20/26 |
| CN | 102833022 A | | 12/2012 | |
| EP | 1370016 A1 | | 12/2003 | |
| EP | 2104344 A1 | | 9/2009 | |

OTHER PUBLICATIONS

English Translation of the Written Opinion of the International Search Authority in international application No. PCT/CN2013/079545, mailed on Oct. 24, 2013.

Supplementary European Search Report in European application number: 13831398.6, mailed on Nov. 20, 2015.

* cited by examiner

BROADCAST SWITCHING DEVICE, METHOD AND TERMINAL

TECHNICAL FIELD

The present disclosure relates to the field of terminal products, and in particular to a broadcast switching device, method and terminal.

BACKGROUND

Frequency Modulation (FM) broadcasting is a technique for transmitting broadcast in a wireless emission manner and transmitting audio signals in an FM manner by using the change of frequencies of high-frequency oscillation over amplitudes of the audio signals.

The China Mobile Multimedia Broadcasting (CMMB) system is a first system developed independently by China for various mobile terminals such as mobile phones, laptop computers and the like. Integratedly aerial and terrestrial coverage and domestic roaming achieved by using S-band signals supports not only 25 television programs but also up to 30 broadcast programs.

Since FM signals received at a mobile phone side are an analog signal, and electrical signals are affected by various interferences both from environment and from within a communication system during their transmission along a route, it is hard to separate noises and signals from each other after their combination, thereby lowering the communication quality; and the longer the route is the more the noises accumulate. In the CMMB system, the received broadcast signals are digital signals, which have the following advantages: 1. the use of advanced digital compression/decompression method enables the provision of Hi-Fi broadcast programs compliant with DRA audio standards; 2. in a weak-field-strength region, its powerful error correction capability can be performed so that no noises are heard; 3. other data services can be conducted conveniently.

At present, most terminals only support reception of broadcast signals in an FM manner, though the FM manner has advantages such as wide signal coverage and convenient reception, it provides users with limited experiences of tone quality due to disadvantages of analog signals; from the viewpoints of the stability of received signals, its extendibility and the richness of program contents provided, broadcast signals of the CMMB are superior, but since broadcast signals of the CMMB are not fully popularized so far, signals can not be well received in certain urban areas or small-sized cities.

Therefore, optimal broadcasting experiences cannot be provided to users by above individual signals in existing techniques.

SUMMARY

Embodiments of the present disclosure provide a broadcast switching device, method and terminal configured to solve the problem in existing techniques that optimal broadcasting experiences cannot be provided to users by individual FM broadcast signals or by individual CMMB signals.

To this end, according to an aspect, embodiments of the present disclosure provide a broadcast switching device and use the following technical solutions:

A broadcast switching device includes: a second signal broadcasting unit configured to broadcast a second signal; a first signal broadcasting unit configured to broadcast a first signal; a signal reception module, connected respectively to the first signal broadcasting unit and the second signal broadcasting unit, configured to receive the first signal and the second signal and receive preferentially the first signal; a parsing module, connected to the signal reception module, configured to parse the first signal to acquire signal strength of the first signal; a determination module, connected to the parsing module, configured to compare the signal strength of the first signal with a preset broadcasting strength and obtain a comparison result; and a switching module, connected to the determination module and the signal reception module, configured to control the signal reception module to receive the second signal when comparison result is that the signal strength of the first signal cannot meet the preset broadcasting strength.

In an embodiment, the broadcast switching device may further include: a record module, connected to the signal reception module, configured to record a current broadcasting position of the first signal; accordingly, the signal reception module is further configured to switch automatically, according to the recorded current broadcasting position of the first signal, to a second signal position corresponding to the recorded current broadcasting position when the first signal is switched to the second signal.

In an embodiment, the broadcast switching device may further include: a setting module, connected to the signal reception module, configured to receive a selection instruction inputted by a user so as to control the signal reception module to receive the first signal or the second signal.

In an embodiment, the broadcast switching device may further include: a monitoring module, connected to the signal reception module, configured to monitor in real time the signal strength of the first signal, and control the signal reception module to receive the first signal when the signal strength of the first signal reaches the preset broadcasting strength.

In an embodiment, the broadcast switching device may further include a broadcasting module configured to provide a list of programs for the user to select one and listen to it.

According to another aspect, embodiments of the present disclosure provide a terminal and use the following technical solution:

the terminal includes the aforementioned broadcast switching device.

According to yet another aspect, embodiments of the present disclosure provide a broadcast switching method and use the following technical solutions:

a broadcast switching method for switching between modes when a terminal receives a broadcasting program, includes: a signal reception module of the terminal is controlled to receive a first signal; the first signal is parsed to acquire signal strength of the first signal; the signal strength of the first signal is compared with a preset broadcasting strength and a comparison result is obtained; and the signal reception module is controlled to receive a second signal when the comparison result is that the signal strength of the first signal cannot meet the preset broadcasting strength.

In an embodiment, before the signal reception module is controlled to receive a second signal, the broadcast switching method may further include: a current broadcasting position of the first signal is recorded, and switching automatically, according to the recorded current broadcasting position of the first signal, to a second signal position corresponding to the recorded current broadcasting position when the first signal is switched to the second signal.

In an embodiment, before the current broadcasting position of the first signal is recorded, the broadcast switching method may further include: a table showing the relationship between the first signal and the second signal is established; when the first signal and the second signal are switched to each other, the signal reception module queries the table to acquire a position of one of the first/second signal corresponding to a current broadcasting position of the other of the first/second signal.

In an embodiment, after the signal reception module is controlled to receive a second signal, the broadcast switching method may further include: the signal strength of the first signal is monitored in real time, and the signal reception module is controlled to receive the first signal when the signal strength of the first signal reaches the preset broadcasting strength.

By means of technical solutions according to embodiments of the present disclosure, FM broadcast signals and CMMB broadcast signals are combined so as to complement each other, thus providing users with optimal audio experiences as well as continuous and wide-range broadcasting.

Besides the objectives, features and advantages described above, embodiments of the present disclosure have other objectives, features and advantages. Embodiments of the present disclosure will be further elaborated below with reference to the accompanying drawings.

BRIEF DESCRIPTION OF THE DRAWINGS

The accompanying drawings are used to provide further understanding of embodiments of the present disclosure and constitute one part of the application, and exemplary embodiments of the present disclosure and corresponding description are used to explain the present disclosure instead of unduly limiting the present disclosure. Wherein.

DETAILED DESCRIPTION

Embodiments of the present disclosure will be elaborated below with reference to the accompanying drawings, but the present disclosure can be applied in different manners defined by the claims.

Figure 1:
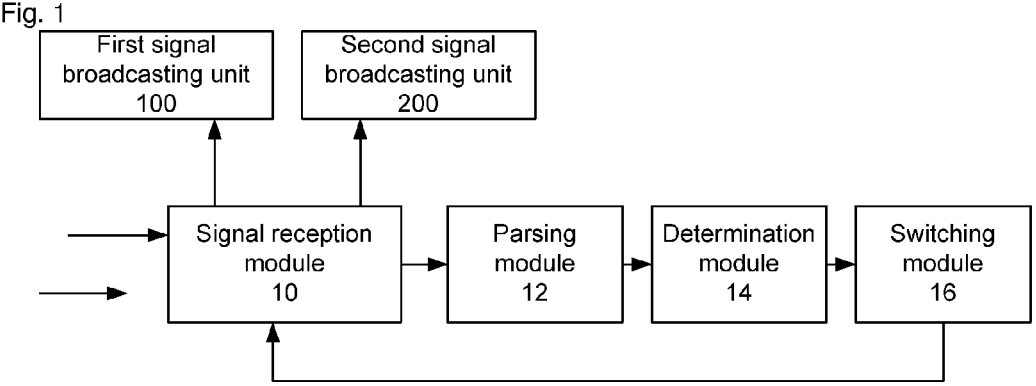
FIG. 1 shows a schematic structural diagram of the broadcast switching device according to an embodiment of the present disclosure.

FIG. 1 shows a schematic structural diagram of the broadcast switching device according to an embodiment of the present disclosure.

Referring to FIG. 1, the broadcast switching device includes: a first signal broadcasting unit 100 and a second signal broadcasting unit 200, the broadcast switching device further includes: a signal reception module 10 configured to receive the first signal and the second signal and receive preferentially the first signal; a parsing module 12, connected to the signal reception module 10, configured to parse the first signal to acquire signal strength of the first signal; a determination module 14, connected to the parsing module 12, configured to compare the signal strength of the first signal with a preset broadcasting strength and obtain a comparison result; and a switching module 16, connected to the determination module 14 and the signal reception module 10, configured to control the signal reception module 10 to receive the second signal when the comparison result is that the signal strength of the first signal cannot meet the preset broadcasting strength.

In the above technical solution of the embodiment, a first signal broadcasting unit 100 takes a digital broadcast signal received by a CMMB chip as an example, a first signal then corresponds to a digital broadcast signal, a second signal broadcasting unit 200 takes a received FM broadcast signal as an example, a second signal then corresponds to an FM broadcast signal; in order to solve technical problems of the embodiments of the present disclosure, the broadcast switching device according to embodiments of the present disclosure further includes: a signal reception module 10 configured to receive in real time a digital broadcast signal (the first signal) and receive preferentially a digital broadcast signal, and transmit the digital broadcast signal to a parsing module 12 while the digital broadcast signal is transmitted to the CMMB chip for being broadcasted; the parsing module 12 configured to parse signal strength of a CMMB broadcast program signal at a position where the user is currently located, i.e., signal strength of the digital broadcast signal; a determination module 14, connected to the parsing module 12, configured to determine whether the signal strength of the CMMB broadcast program signal at the current position meets broadcasting requirements that enables a fluent broadcasting of broadcast programs (refer to key indexes of mobile TV signals), and transmit a comparison result to a switching module 16 when the signal strength of the CMMB broadcast signal cannot meet the broadcasting requirements; and the switching module 16 configured to receive an input from the determination module 14 and switch broadcast modes (including switching from CMMB broadcast to FM and switching from FM to CMMB broadcast) when the signal strength changes.

By means of above technical solution of the embodiment, since a digital audio signal received by the CMMB chip has good tone quality and is less disturbed, the signal source is preferentially used; when the signal strength is below a preset threshold, the advantage of wide coverage of FM is used to ensure uninterrupted broadcasting of a program, thus ensuring both sound effect experiences for the user and the continuity of the reception.

In one embodiment, the broadcast switching device may further include a record module 18, connected to the signal reception module 10, configured to record a current broadcasting position of the first signal; accordingly, the signal reception module 10 is further configured to switch automatically, according to the recorded current broadcasting position of the first signal, to a second signal position corresponding to the recorded current broadcasting position when the first signal is switched to the second signal.

Figure 2:
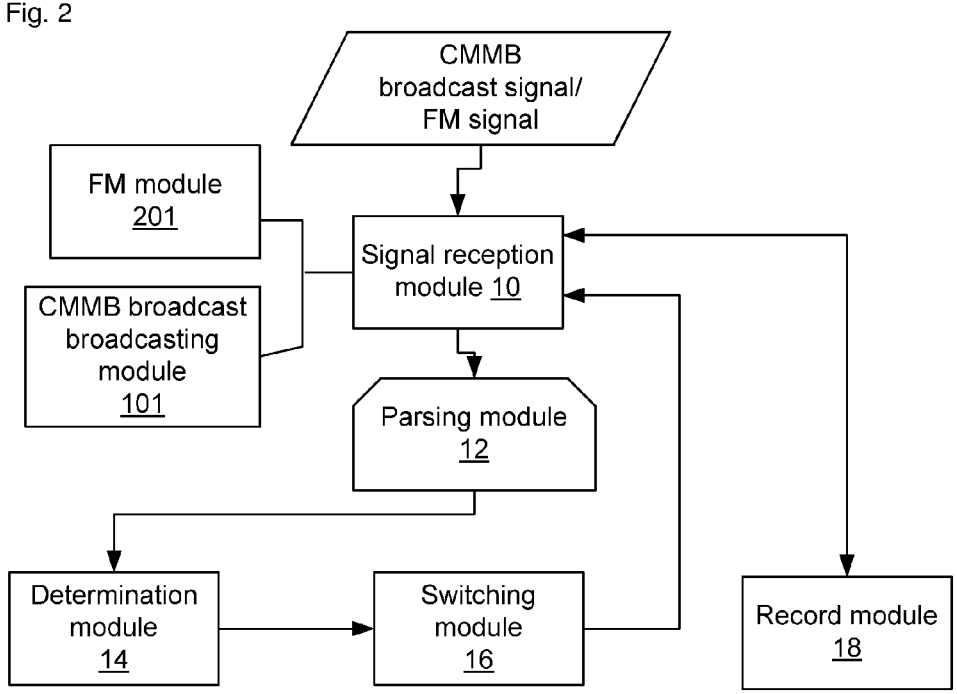
FIG. 2 shows a schematic structural diagram of the broadcast switching device according to another embodiment of the present disclosure.

FIG. 2 shows a schematic structural diagram of the broadcast switching device according to another embodiment of the present disclosure.

Referring to FIG. 2, in the embodiment, a first signal broadcasting unit 100 is a CMMB broadcast broadcasting module 101, a first signal then corresponds to a digital broadcast signal, while a second signal broadcasting unit 200 is an FM module 201, a second signal then corresponds to FM broadcast signal. When a determination module 14 determines that signal strength of a digital broadcast signal cannot meet a preset broadcasting strength, a switching module 16 may control a signal reception module 10 to switch from receiving currently the digital broadcast signal to receiving the FM broadcast signal, a record module 18 can then record a currently broadcasting program by a user and a broadcasting position of the program, and when the signal reception module 10 performs reception switching, a position at which the FM broadcast signal is received is automatically corresponded to the currently broadcasting program by the user and the broadcasting position of the program.

The embodiment records a currently broadcasting program by a user through the record module 18, which can switch automatically to a currently broadcasting position of the user when switching between a digital program and a broadcast frequency is perform, thus providing the user with uninterrupted audio experiences.

In one embodiment, the broadcast switching device may further include: a setting module (not shown in the drawing), connected to the signal reception module 10, configured to receive a selection instruction inputted by a user so as to control the signal reception module 10 to receive the first signal or the second signal.

The setting module (not shown in the drawing) is configured to, according to users selection, determine whether the dynamic switching of signal sources is allowed, and it is further configured to: receive preferentially the first signal or the second signal according to user's selection, and switch randomly from receiving the first signal to receiving the second signal or switch randomly from receiving the second signal to receiving the first signal without depending on determination results of the determination module 14, thus providing the user with experiences of free-selected receptions.

In one embodiment, the broadcast switching device may further include a broadcasting module (not shown in the drawing) configured to provide a list of programs for the user to select one and listen to it.

In one embodiment, the broadcast switching device may further include: a monitoring module (not shown in the drawing), connected to the signal reception module 10, configured to monitor in real time the signal strength of the first signal, and control the signal reception module 10 to receive the first signal when the signal strength of the first signal reaches the preset broadcasting strength.

The broadcasting module (not shown in the drawing) includes functions such as providing a user with a list of programs for the user to select, and it provides a visual and convenient operation interface.

According to embodiments of the present disclosure, provided is a terminal including the above broadcast switching device.

Figure 3:
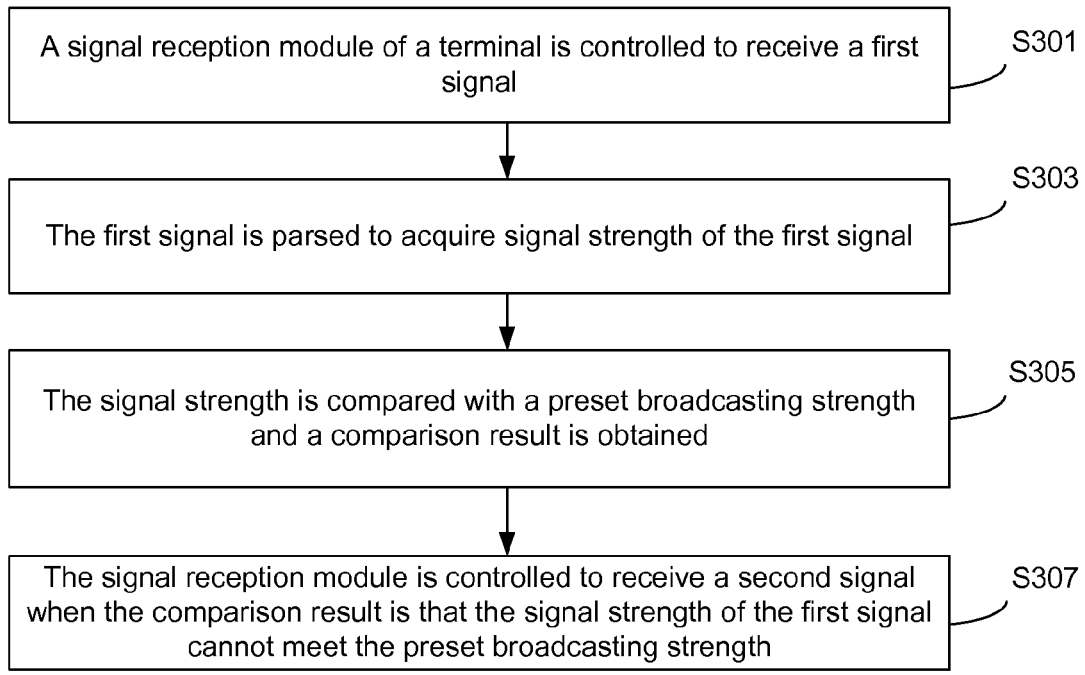
FIG. 3 shows a flow chart of the broadcast switching method according to an embodiment of the present disclosure.

FIG. 3 shows a flow chart of the broadcast switching method according to an embodiment of the present disclosure.

Referring to FIG. 3, the broadcast switching method includes:

S301, a signal reception module of a terminal is controlled to receive a first signal;

S303, the first signal is parsed to acquire signal strength of the first signal;

S305, the signal strength is compared with a preset broadcasting strength and a comparison result is obtained;

S307, the signal reception module is controlled to receive a second signal when the comparison result is that the signal strength of the first signal cannot meet the preset broadcasting strength.

The embodiment can take a user listening to a digital broadcast signal (first signal) and an FM broadcast signal (second signal) as an example, after choosing to listen to a broadcast program, the user enables a CMMB chip so that a digital broadcast signal is received, wherein information regarding the broadcast program and information regarding current signal strength are included. The CMMB chip demodulates the signal, and sends data to a corresponding module of the terminal. Signal strength of the current digital broadcast signal is parsed from data sent by the CMMB chip and it is regarded as a criterion for determining signal strength of the current signal. The signal strength of the current digital broadcast signal is determined according to data regarding the signal strength, if the signal strength reaches a preset determination threshold, reception of a digital broadcast signal is enabled, and frame data of a broadcast program are parsed, then parsed data are sent to an audio broadcasting interface for being outputted; if the signal strength does not reach the threshold, the switching module of the terminal is enabled, then the switching between a current program and a broadcast frequency is performed, and a frequency record of the current program is saved.

In the above technical solution of the embodiment, when a user chooses to listen to a broadcast program, a digital broadcast signal received by a CMMB chip is preferentially parsed and broadcasted, thus providing the user with optimal tone quality; when signal strength of a SMMB broadcast signal i.e., the signal strength of a digital broadcast signal cannot meet broadcasting requirements, an FM broadcast signal is automatically switched to so as to provide the user with a continuous broadcasting, thus taking into account the users experiences regarding continuity while his/her experience regarding tone quality is improved.

Figure 4:
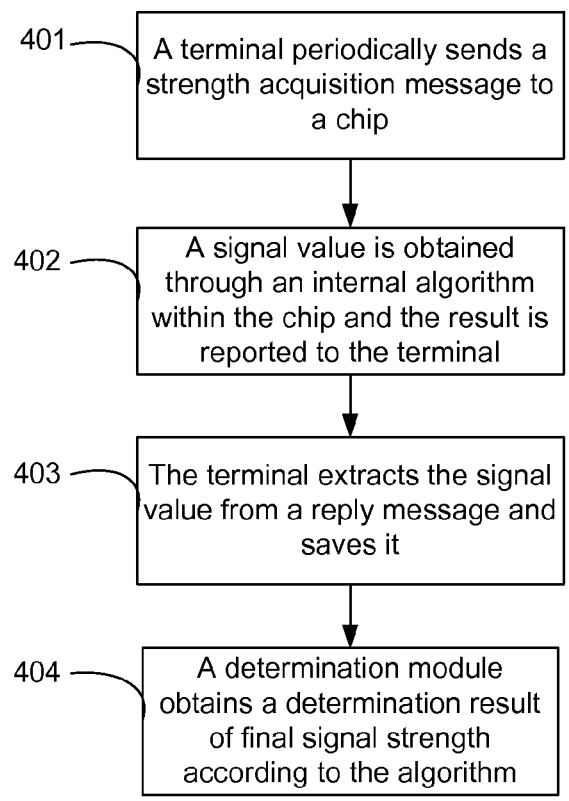
FIG. 4 shows a flow chart of determining the signal strength of a first signal in the broadcast switching method according to an embodiment of the present disclosure.

Specifically, specific steps for determining the strength of the first signal are as shown in FIG. 4.

FIG. 4 shows a flow chart of determining the signal strength of a first signal in the broadcast switching method according to an embodiment of the present disclosure.

Referring to FIG. 4, the embodiment still takes a digital broadcast signal (first signal) and an FM broadcast signal (second signal) as an example, the determination of signal strength of the first signal may include:

Step 401, a terminal sends periodically a message to a CMMB chip requiring to acquire signal strength of mobile TV at a current position.

In specific implementation, different CMMB chips have different corresponding messages, in this example, it corresponds to an SIANO chip, and it is desired to set an appropriate time interval for acquiring signals, for example, it is desired to take into account a rate at which the position of the user moves, in this way, the efficiency of the system is improved.

Step 402, after receiving a request and through an internal algorithm, the CMMB chip sends a result of the signal strength to the terminal through a reply message.

Step 403, the terminal extracts from the reply message of the CMMB chip related signal values and saves them as an input of a determination module of the terminal.

Signal values reported by a CMMB chip include: 1. bit error rate configured as an index to measure data transmission accuracy within a determined time period; 2. signal-noise ratio, wherein a higher signal-noise ratio of a device indicates less noises generated by the device. In general, a greater signal-noise ratio indicates that less noises are included in a signal thus tone quality of voice playback is higher and the signal-noise ratio is a key index of a reference signal strength; 3. in-band power, which indicates a input power in a current environment received by a terminal. Key data bits of the message reported by the chip are parsed so as to acquire desirable key values.

404. according to data saved by the parsing module of the terminal, the determination module obtains a final determination of signal quality according to a related algorithm.

In the embodiment, a determination is performed based on three values in step 403, in one embodiment, determination of the bit error rate is performed, if the bit error rate is non-zero, it indicates that the signal strength of the current environment is poor, switching is then performed directly; otherwise the signal-noise ratio and in-band power need to be further compared, chips of different manufacturers subjected to a large number of sensitivity testings and then appropriate recommended values are obtained, thus values can be set depending on chips, and other reference items can certainly be depended on instead of only limiting to reference items described in the embodiment.

Figure 5:
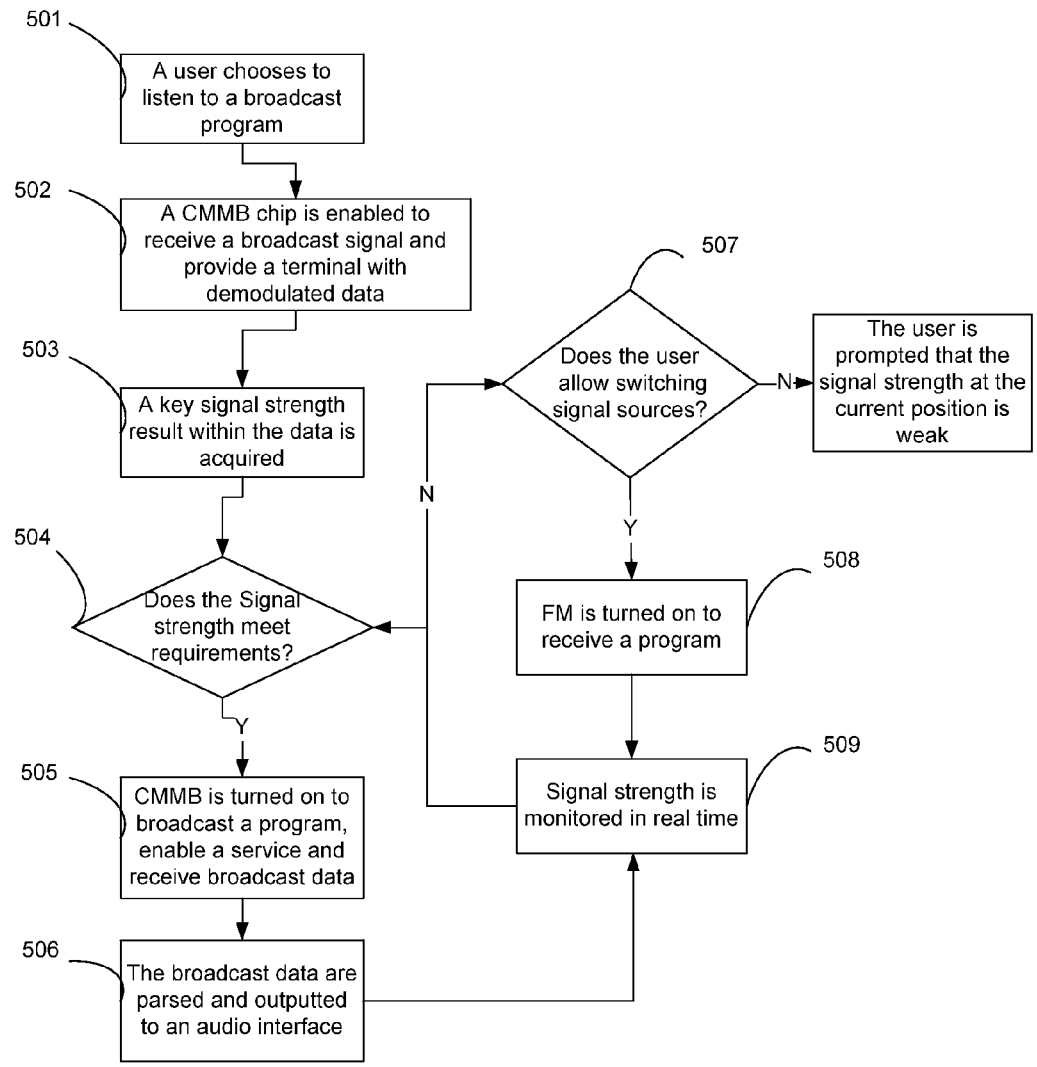
FIG. 5 shows a flow chart of the broadcast switching method according to another embodiment of the present disclosure.

FIG. 5 shows a flow chart of the broadcast switching method according to another embodiment of the present disclosure.

Referring to FIG. 5, the embodiment still takes a digital broadcast signal (first signal) and an FM broadcast signal (second signal) as an example, the broadcast switching method may include:

Step 501, a user chooses to listen to a broadcast program.

Step 502, a CMMB chip is preferentially enabled to receive a CMMB broadcast signal, and the signal is sent to the terminal after being demodulated.

Wherein the CMMB broadcast signal is namely a digital broadcast signal.

Step 503, the terminal actively sends a message to the CMMB chip to acquire a key signal strength result of the CMMB chip, in the embodiment, parsed key signal strength result includes: the bit error rate, signal-noise ratio and signal input strength of a signal at the current position.

Step 504, according to the key signal result acquired in step 503, it is determined whether the result can meet a minimum signal threshold for receiving a broadcast program using the CMMB broadcast signal, and if it meets, proceed to step 505.

In the embodiment, according to acquired key signal strength result, signal status is determined, the premise of providing a user with better tone quality by using a CMMB broadcast signal to broadcast a broadcast program is that a continuous reception of the program by the user can be affected, if the premise cannot be achieved, a continuous broadcasting precedes, then proceed to step 507.

Step 505, when the signal strength at the current position meets a condition for broadcasting using a CMMB broadcast signal, a broadcasting interface is enabled so as to parse a program list, and a service is enabled based on a program selected by the user, i.e., receiving broadcast data from the CMMB chip.

A multiplexed frame of a broadcast program includes 40 logic channels, thus a second is divided into 40 time slots, one of the logic channels is a control logic channel, from which a program list can be parsed for a user to select one program and broadcast it, after the user selects a corresponding service, the terminal then receives from the chip multiplexed frame data of a corresponding time slot. Wherein a first logic channel is a logic channel having a number of 0.

Step 506, the terminal parses received multiplexed frame data and calls an audio interface to broadcast them.

CMMB audio complies with the DRA audio standard, and the standard has a multi-channel audio signal source encoding/decoding technique with international advanced level, which has advantages such as low encoding complexity, high compression rate, good tone quality, in a encoding/decoding process by the DRA technique, all signal passages have an accurate capacity of 24 bits, thus it can provide tone quality which exceeds human hearing capability when the code rate is sufficient.

Step 507, the terminal determines according to user options whether it can be automatically switched to an FM broadcast, if Yes, proceed to step 508, otherwise, the terminal prompts the user that the signal strength at the current position is weak.

Step 508, FM and broadcasting interface are turned on to receive broadcast signals and output them to audio interface.

Since there are no frequency points of an FM broadcast corresponding to a program in the CMMB broadcast signal, it is desired to establish a table showing the relationship between a CMMB broadcast program and a broadcast frequency point, for example, program A corresponds to frequency 89.7 MHz. When the FM is turned on, a frequency sweep is performed based on a saved current frequency and the current frequency point is locked so as to broadcast at that frequency, thus achieving a continuous broadcasting and providing a user with optimal experiences to avoid a pause or disfluency caused by the switching of broadcasting. Similarly, the table needs to be queried when FM is switched to a CMMB digital broadcast so that program switching can be performed.

Step 509, during FM broadcasting, the switching module of the mobile terminal monitors in real time a change in signal strength, once it is found that the signal strength meets a broadcasting threshold, switch immediately to broadcasting of CMMB broadcast signals and proceed to step 505; when broadcasting of CMMB broadcast signals, it is also desired to monitor in real time the signal strength, once the requirement cannot be met, FM broadcasting is enabled, and then proceed to step 507.

By means of technical solutions according to embodiments of the present disclosure, FM broadcast signals and CMMB broadcast signals are combined so as to complement each other, thus providing users with optimal audio experiences as well as continuous and wide-range broadcasting.

The invention claimed is:

1. A broadcast switching device comprising a second signal broadcasting unit configured to broadcast a second signal, wherein the broadcast switching device further comprises:
   a first signal broadcasting unit configured to broadcast a first signal;
   a signal reception module, connected respectively to the first signal broadcasting unit and the second signal broadcasting unit, configured to receive the first signal and the second signal and receive preferentially the first signal;
   a parsing module, connected to the signal reception module, configured to parse the first signal to acquire signal strength of the first signal;
   a determination module, connected to the parsing module, configured to compare the signal strength of the first signal with a preset broadcasting strength and obtain a comparison result; and
   a switching module, connected to the determination module and the signal reception module, configured to control the signal reception module to receive the second signal when the comparison result is that the signal strength of the first signal cannot meet the preset broadcasting strength.

2. The broadcast switching device according to claim 1, further comprising:
   a record module, connected to the signal reception module, configured to record a current broadcasting position of the first signal;
   wherein the signal reception module is further configured to switch automatically, according to the recorded current broadcasting position of the first signal, to a second signal position corresponding to the recorded current broadcasting position when the first signal is switched to the second signal.

3. The broadcast switching device according to claim 1, further comprising:
a setting module, connected to the signal reception module, configured to receive a selection instruction inputted by a user so as to control the signal reception module to receive the first signal or the second signal.

4. The broadcast switching device according to claim 1, further comprising:
a monitoring module, connected to the signal reception module, configured to monitor in real time the signal strength of the first signal, and control the signal reception module to receive the first signal when the signal strength of the first signal reaches the preset broadcasting strength.

5. The broadcast switching device according to claim 1, further comprising:
a broadcasting module configured to provide a list of programs for the user to select one and listen to it.

6. A terminal comprising the broadcast switching device according to claim 1.

7. A broadcast switching method for switching between modes when a terminal receives a broadcasting program, comprising:
controlling a signal reception module of the terminal to receive a first signal;
parsing the first signal to acquire signal strength of the first signal;
comparing the signal strength of the first signal with a preset broadcasting strength and obtaining a comparison result; and
controlling the signal reception module to receive a second signal when the comparison result is that the signal strength of the first signal cannot meet the preset broadcasting strength.

8. The broadcast switching method according to claim 7, further comprising before the controlling the signal reception module to receive a second signal,
recording a current broadcasting position of the first signal, and switching automatically, according to the recorded current broadcasting position of the first signal, to a second signal position corresponding to the recorded current broadcasting position when the first signal is switched to the second signal.

9. The broadcast switching method according to claim 8, further comprising before the recording a current broadcasting position of the first signal,
establishing a table showing the relationship between the first signal and the second signal;
when the first signal and the second signal are switched to each other, querying, by the signal reception module, the table to acquire a position of one of the first/second signal corresponding to a current broadcasting position of the other of the first/second signal.

10. The broadcast switching method according to claim 7, further comprising after the controlling the signal reception module to receive a second signal,
monitoring in real time the signal strength of the first signal, and controlling the signal reception module to receive the first signal when the signal strength of the first signal reaches the preset broadcasting strength.

* * * * *